United States Patent

Sawyer

[11] 3,972,190
[45] Aug. 3, 1976

[54] VEHICLE BRAKE PEDAL ARRANGEMENTS

[75] Inventor: Patrick Frank Sawyer, Birmingham, England

[73] Assignee: Girling Limited, Birmingham, England

[22] Filed: Nov. 18, 1974

[21] Appl. No.: 525,009

[30] Foreign Application Priority Data
Dec. 3, 1973 United Kingdom............... 55875/73
Mar. 8, 1974 United Kingdom............... 10589/74

[52] U.S. Cl................................... 60/551; 74/512
[51] Int. Cl.² ........................................ B60F 15/16
[58] Field of Search ........................... 60/550-552, 60/582; 188/204 R; 74/512, 518, 522, 512

[56] References Cited
UNITED STATES PATENTS

| | | | |
|---|---|---|---|
| 2,752,892 | 7/1956 | Banker | 60/551 X |
| 2,836,265 | 5/1958 | Ingres | 60/550 X |
| 3,075,502 | 1/1963 | Sadler | 60/550 X |
| 3,371,486 | 3/1968 | Hager | 60/550 X |
| 3,373,661 | 3/1968 | Reichard | 60/550 X |

*Primary Examiner*—Martin P. Schwadron
*Assistant Examiner*—H. Burks
*Attorney, Agent, or Firm*—Scrivener Parker Scrivener and Clarke

[57] ABSTRACT

A brake actuating assembly for actuating a master cylinder having a power assistor comprises a brake pedal pivotable about a pivot point at one end and connected at a point intermediate its ends to an actuating member of the master cylinder, movement of the actuator member also actuating the power assistor, the pivot point being connected to a piston of a fluid motor operable in response to the operating pressure of the power assistor the arrangement being such that in normal operation the pressure of the power assistor actuates the piston to hold the pivot point in a fixed position but upon failure of the power assisting means the pivot point is moved to vary the pedal ratio, to permit the master cylinder to be operated without power assistance.

7 Claims, 3 Drawing Figures

VEHICLE BRAKE PEDAL ARRANGEMENTS

This invention relates generally to vehicle brake actuating systems and particularly to pedal assemblies for use with master cylinders having power assisting means.

The pedal ratio which is suitable for normal power assisted operation of the master cylinder may not be suitable if the power assisting means fails, because the user may be incapable of producing the force required to operate the master cylinder without power assistance. For this reason it is known to arrange for the pedal ratio to be different in the failed condition of the power assisting means so that the user can apply the desired operating force to the master cylinder, but with a greater pedal travel being required.

In a previously proposed actuating system the power assisting means is combined with a pedal assembly which is operative in the failed condition of the power assisting means to change the pedal ratio, but the system requires a special arrangement of servo or power assisting means and pedal assembly, so that to use the system in present production vehicles require considerable change of design and possibly some considerable changes in the production line. Furthermore, in known vacuum systems there may be a lag between the movement of the brake pedal and the operation of the power assisting means to apply an assisting force to the brake pedal so that the "feel" of the brake pedal is interrupted when the power assisting means catches up with the brake pedal.

The present invention aims to overcome these problems and in accordance with one feature of the invention, there is provided a brake pedal assembly for actuating a master cylinder having power assisting means, comprising a brake pedal pivotable about a pivot point and having a pivotal connection at a point intermediate its ends with an actuating member movable with the pedal to actuate the master cylinder, wherein said pivot point is held fixed during normal operation and is movable upon failure of the power assisting means, and wherein the force of the power assisting means is applied to the pedal at said connection intermediate the ends of the pedal.

In accordance with another feature of the invention, there is provided a brake actuator assembly for actuating a master cylinder having power assisting means, comprising a brake pedal pivotable about a pivot point and connected at a point intermediate its ends to an actuating member of the master cylinder, movement of the actuator member also actuating the power assisting means, said pivot point being connected to a piston of a fluid motor operable in response to the operating pressure of the power assisting means, the arrangement being such that in normal operation the pressure of the power assisted means actuates the piston to hold the pivot point in a fixed position but upon failure of the power assisting means the pivot point is moved to vary the pedal ratio.

Two forms of a brake actuating system including a brake pedal assembly in accordance with the invention operating a master cylinder having power assisting means will now be described, by way of example, with reference to the accompanying drawings, in which.

Figure 1:
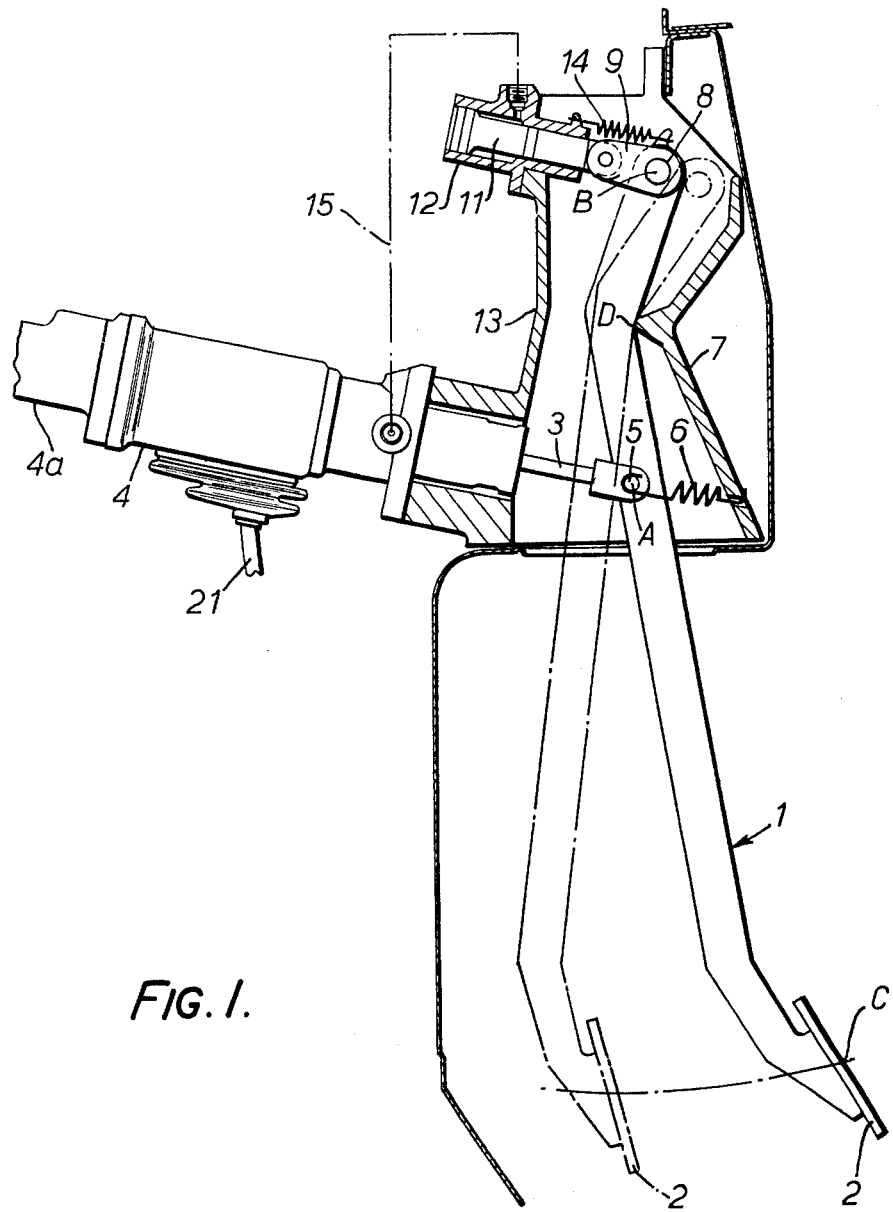
FIG. 1 is an axial cross-section of one embodiment of the system.

The actuating system comprises a pedal 1 having a foot plate 2 at its lower end and being pivotally connected intermediate its ends by a pivot pin 5 to an actuating member 3 operatively connected through the power assisting device or "booster" 4 to the master cylinder 4a. The pivot pin 5 has a pivot axis A. A brake pedal return spring 6 acts between the pivot pin 5 and a fixed frame 7, which may be the vehicle frame, to bias the pedal against a fulcrum D on the frame 7.

The upper end of the pedal 1 is pivotally connected by a pivot pin 8 having a pivot axis B to a link 9 pivotally connected to a fluid operated motor comprising a piston 11 working in a cylinder 12 mounted on the housing 13, which may be connected with the frame 7, supporting the power assisting device 4.

A tension spring 14 biases the upper end of pedal 1 towards the cylinder 12.

The foot pedal 1 normally adopts the right hand position shown in full lines when it is inoperative, the spring 14 holding the pivot pin 8 in its illustrated position. When foot pressure is applied manually to the pedal, say at point C, the pedal pivots about upper pivot axis B and moves the actuating member 3 to the left to operate the booster, the spring 14 being of sufficient strength to resist movement of the pivot pin 8 before the booster is actuated, the booster pressure is then introduced through a pressure line 15 into cylinder 12 to urge the piston 11 to the left and retain the pivot pin 8 and thus pivot axis B in the same position for the rest of the brake pedal movement to the other, extreme left position shown in chain link lines, the manual force being assisted by the booster in known manner. Under these normal operating conditions the pedal ratio is the ratio of the distances AC and AB.

The biasing force of spring 14 is chosen so that it is overcome just after the booster would normally be operated to assist the master cylinder and hold the pivot pin 8 stationary. Therefore, if the booster pressure fails the pedal 1 pivots about upper axis B until just after the booster would normally become operative, and thereafter the spring 14 is expanded, due to the reaction at pivot point A, to move the pivot axis B rearwardly until the pedal 1 again abuts the fulcrum D. During this latter part of the pedal movement after the force of spring 14 has been overcome, there is no increase in braking pressure since the axis A remains stationary and the pedal pivots about that axis. For the rest of the pedal travel the pedal pivots about fulcrum D and the pedal ratio will be the ratio of the distances AC and AD, so that the effect of the booster failure is reduced by the adjustment of the pedal ratio.

Figures 2, 3:
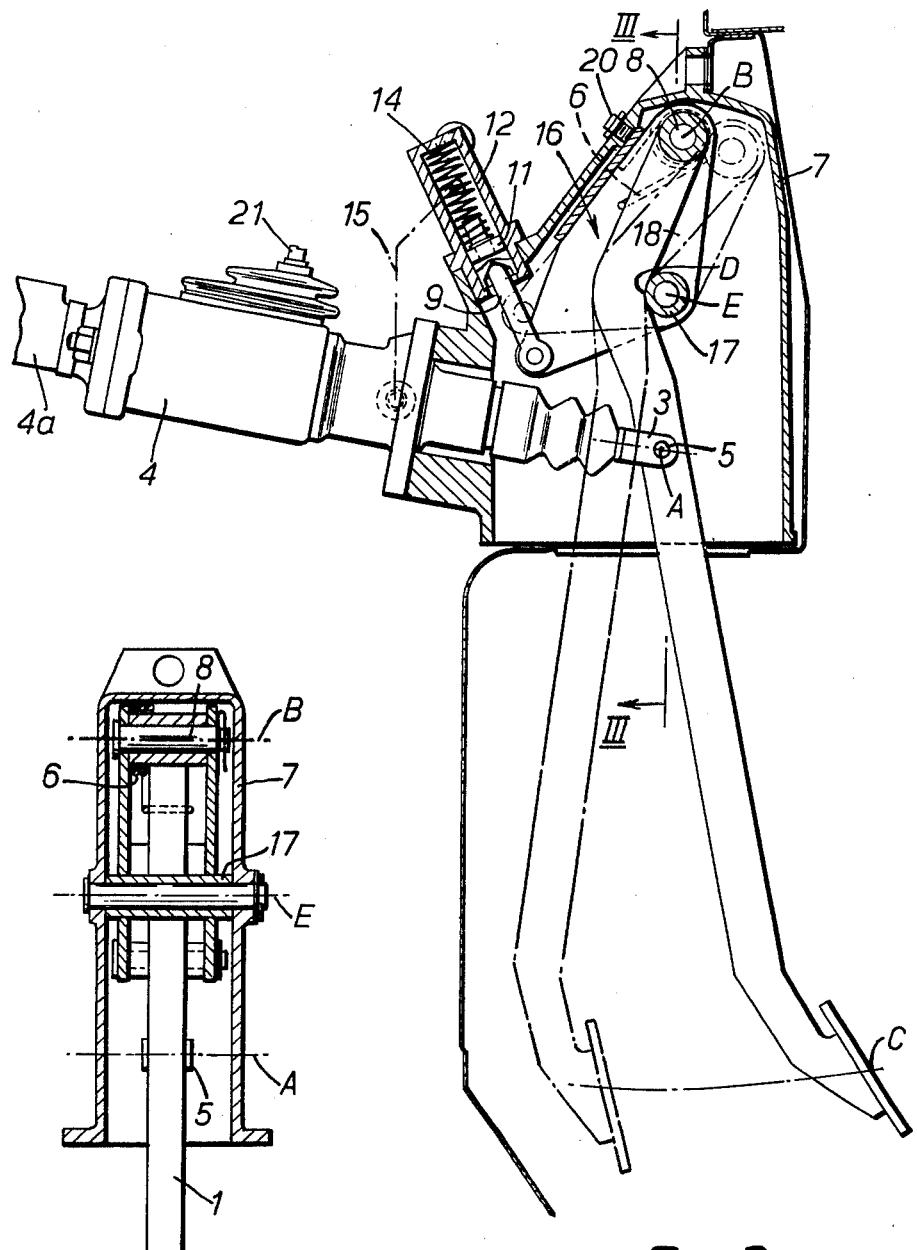
FIG. 2 is an axial cross section of another embodiment of the system.
FIG. 3 is a section taken along the lines III—III in FIG. 2.

The actuating system illustrated in FIGS. 2 and 3 is generally similar to that of FIG. 1 and the same reference numerals have been used to denote corresponding parts. The main differences are that the link 9 is connected to the pedal 1 through a bell-crank assembly 16 pivotable about a fixed pivot constituted by a sleeve 17 providing the fulcrum D; that the spring 14 is located within the cylinder 12 of the rotor, the piston 11 being urged outwardly of the cylinder 12; and that the pedal return spring 6 is a torsion spring acting between the assembly 16 and the pedal 1.

The upper end of the pedal 1 is pivotally mounted on the pivot pin 8 carried by one arm of the bell-crank assembly 16 comprising a pair of parallel plates 18. The other arm of the bell-crank is pivotally connected to one end of the link 9, the other end of which engages the piston 11 working in a cylinder 12 mounted on the fixed frame 7 the cylinder is in fluid flow communication with the booster through conduit 15. The coil compression spring 14 biases the piston 11 into engagement with the link 9 and urges the bell-crank 16 against an adjustable stop 20.

The plates 18 are welded or otherwise fixed to the cylindrical sleeve 17 which is rotatably mounted on the fixed pivot pin 17 having an axis E and extending between and being fixed relative to the fixed frame 7. The pedal 1 is angled and is biased by the torsion spring 6 surrounding the pin 8 so that the angle engages the sleeve 17 at the fulcrum point D.

The foot pedal normally adopts the inoperative position shown in full lines. When foot pressure is applied to the pedal at point C the pedal pivots about the upper pivot axis B due to the fact that the effect of spring 14 on bell crank 15 is greater than that of torsion spring 6 and the piston 3 is moved to the left to actuate the booster. The booster pressure is then introduced into the cylinder 12 and the piston 11 is urged towards the open end of the cylinder i.e. to the illustrated position, to hold the bell crank 16 in its illustrated position with the pivot axis B fixed. The rest of the pedal movement to apply the brake is about the axis B. Under these normal operating conditions the pedal ratio is the ratio of the distances AC and AB.

If the booster pressure fails application of pressure to the pedal at C pivots the pedal initially about pivot axis B and lifts the pedal from the fulcrum D until reaction from the master cylinder 4 is sufficient to overcome the force of spring 19, which is overcome just after the booster would normally be operated, as in the first described system. Bell crank 16 then pivots about pivot axis E, since there is no pressure in the cylinder 12 to prevent rotation of the bell crank and the pedal pivots about axis A, until the angle on the pedal 1 comes into contact with fulcrum D. Then the pedal and bell crank continue pivotal movement about pivot axis E while the pressure is applied to the pedal until the bell crank reaches the position shown in chain link lines in FIG. 2. For these operating conditions the pedal ratio is the ratio of the distances AC and AE.

In each of the above-described systems, the booster is operated from a high pressure source connected through a conduit 21, the operating pressure applied to the piston 11 normally being dependent upon the brake pedal travel. However, other forms of power assisting device could be used, for example a known vacuum-actuated device, the motor comprising the piston 11 and cylinder 12 being suitably modified to ensure that the pivot pin 8 is normally held fixed when the booster is operated.

The pedal assemblies described above have the advantage that they may be used with a conventional master cylinder 4a and booster or servo system 4 so that existing production lines need not be extensively modified. Furthermore, for each assembly, since the power assisting force is applied to the pedal 1 at the pivot pin 5, the pedal travel rotor and the load ratio are equal. In addition, there is no appreciable time lag between the actuation of the booster by the pedal and the power assisting force acting on the pedal so that there is no interruption of the "feel" of the pedal.

I claim:

1. A brake pedal assembly for actuating a master cylinder having a power assisting means, comprising a brake pedal pivotable about a first movable pivot point, an actuating member having a pivotal connection with said brake pedal at a point intermediate the ends of said pedal, said actuating member being movable with said pedal to actuate said master cylinder, means holding said first pivot point in a fixed position during normal operation of said power assisting means so that said pedal normally pivots about said first pivot point, means applying the force of said power assisting means to said brake pedal, and a fixed fulcrum intermediate said first-mentioned pivot point and said connection between said pedal and said actuating member and being engageable by said pedal to define a second pivot point about which said pedal fulcrums upon failure of said power assisting means.

2. An assembly according to claim 1, including spring means biasing said first pivot point to its normal, fixed position.

3. An assembly according to claim 1, wherein said means applying the force of said power assisting means to said brake pedal applies said force at said connection intermediate the ends of said pedal.

4. An assembly according to claim 1, including a cylinder, and a piston connected to said pedal and working in said cylinder, wherein said piston is subjected to the operating pressure of said power assisting means whereby in normal operation said first pivot point is held fixed by said piston.

5. An assembly according to claim 4, wherein said fixed fulcrum includes a fixed pivot, a bell-crank pivotable about said fixed pivot, and connecting said pedal to said piston.

6. A brake pedal assembly for actuating a master cylinder having power assisting means, comprising a brake pedal pivotable about a first movable pivot point, an actuating member having a pivotal connection with said brake pedal at a point intermediate the ends of said pedal and being movable with said pedal to actuate said master cylinder, means holding said pivot point in a fixed position during normal operation of said assembly, said brake pedal being pivotable about a different pivot point upon failure of said power assisting means, means for applying the force of said power assisting means to said brake pedal, a fixed fulcrum intermediate said first pivot point and said connection between said pedal and said actuating member, said pedal being engageable with said fulcrum in the failed condition of said power assisting means, and a bell-crank pivotable about said fixed pivot, and interconnecting said piston and said pedal said fixed pivot comprising said fixed fulcrum.

7. An assembly according to claim 6, including spring means located within said cylinder and biasing said piston in a direction to hold said pivot point in its fixed first position.

* * * * *